Figure 1:
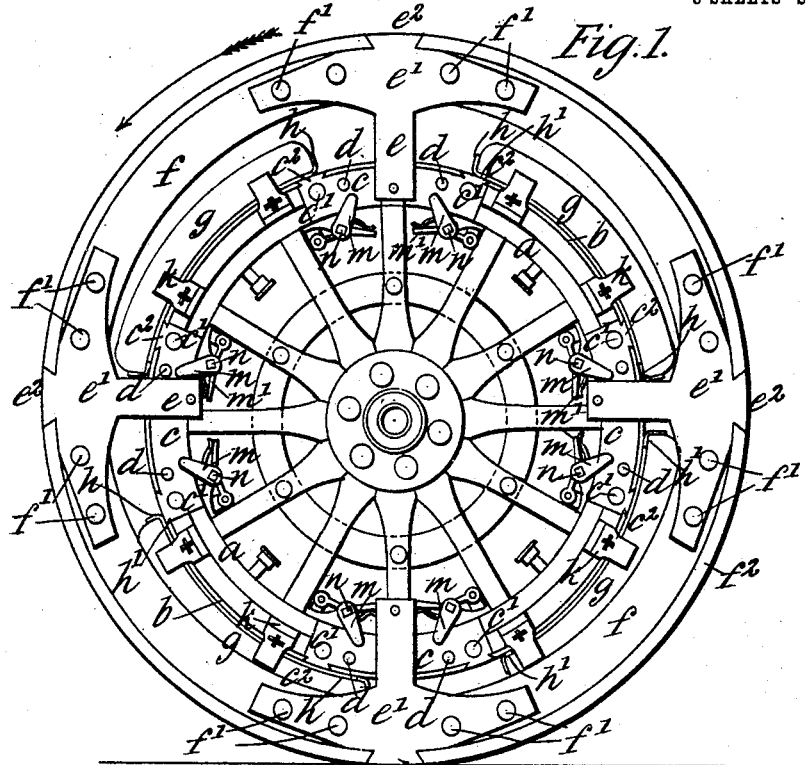

No. 831,979. PATENTED SEPT. 25, 1906.
G. S. OGILVIE.
WHEEL FOR ROAD VEHICLES.
APPLICATION FILED MAR. 7, 1905.

3 SHEETS—SHEET 1.

No. 831,979. PATENTED SEPT. 25, 1906.
G. S. OGILVIE.
WHEEL FOR ROAD VEHICLES.
APPLICATION FILED MAR. 7, 1905.
3 SHEETS—SHEET 2.
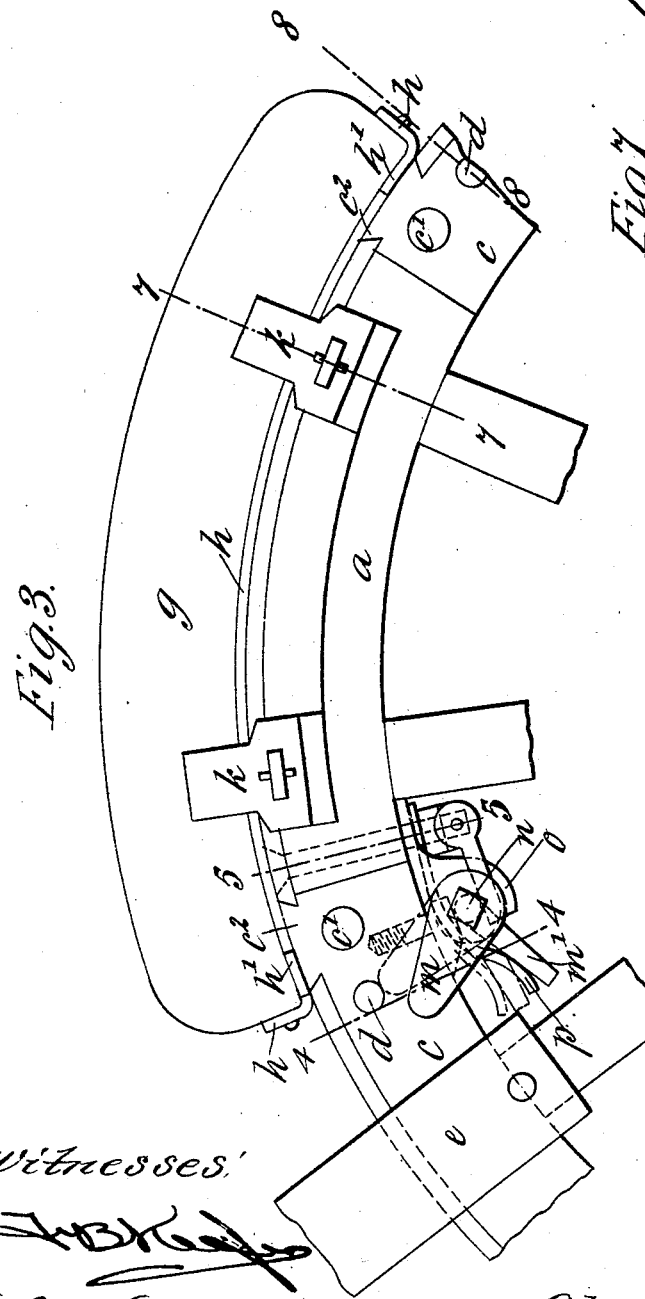
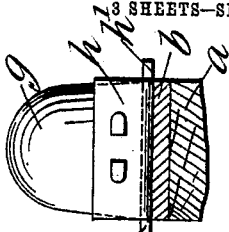
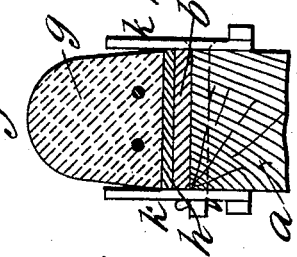
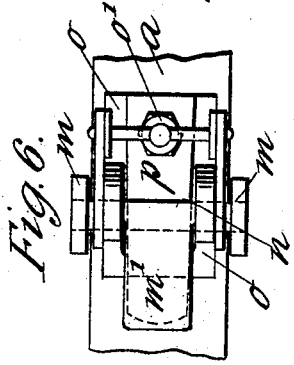
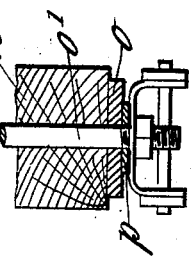
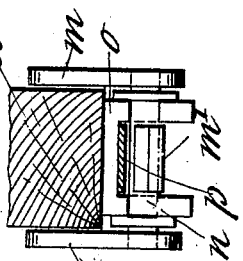
Witnesses:
Inventor
Glencairn S. Ogilvie
By James L. Norris
Atty
THE NORRIS PETERS CO., WASHINGTON, D. C.

No. 831,979. PATENTED SEPT. 25, 1906.
G. S. OGILVIE.
WHEEL FOR ROAD VEHICLES.
APPLICATION FILED MAR. 7, 1905.
3 SHEETS—SHEET 3.
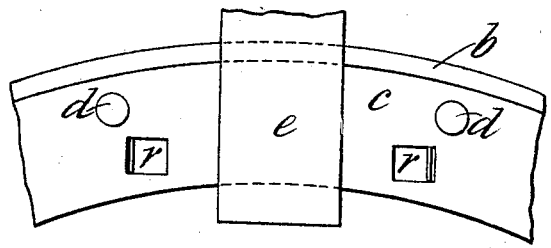
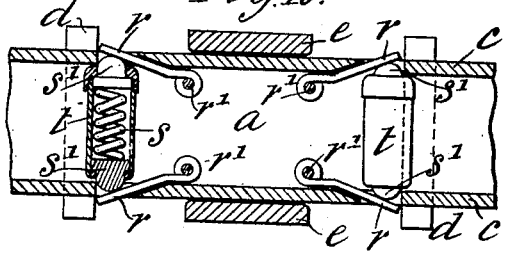
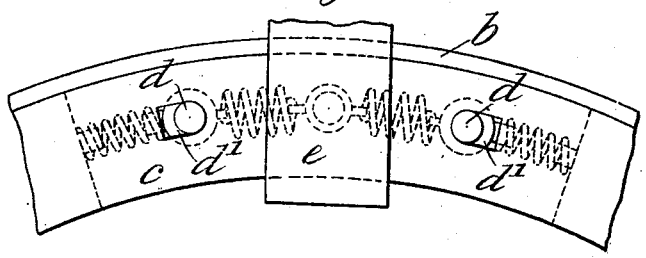
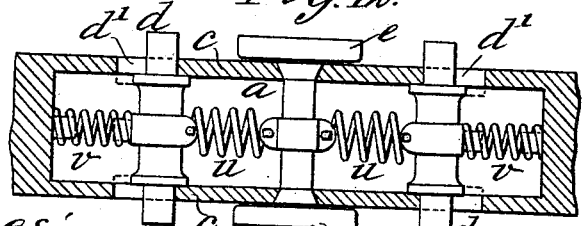
Witnesses: Inventor
Glencairn S. Ogilvie

UNITED STATES PATENT OFFICE.

GLENCAIRN STUART OGILVIE, OF WOODBRIDGE, ENGLAND.

WHEEL FOR ROAD-VEHICLES.

No. 831,979.   Specification of Letters Patent.   Patented Sept. 25, 1906.

Application filed March 7, 1905. Serial No. 248,934.

*To all whom it may concern:*

Be it known that I, GLENCAIRN STUART OGILVIE, a subject of the King of Great Britain, whose post-office address is The Lodge, Woodbridge, in the county of Suffolk, England, have invented certain new and useful Improvements in Wheels for Road-Vehicles, of which the following is a specification.

This invention relates to wheels for road or other vehicles of the kind in which the rim and felly are not rigidly connected with each other, but have interposed between them a spring-cushion or spring-cushions by which a certain resiliency is obtained and are correlated for driving purposes by means of stops or drivers on the rim and felly, respectively. In such wheels it is advisable, as described in my United States Patent No. 782,518, dated February 14, 1905, and in my pending application, filed on June 28, 1904, Serial No. 214,491, that the two members of the wheel should have a relative circumferential freedom at least equal to their maximum relative radial freedom. Since owing to the eccentricity of the rim and felly under ordinary running conditions each set of driving-stops is in engagement during a part only of each revolution, it will be obvious that there will be a constant succession of impact shocks of the driving-stops, and although these shocks may be inappreciable when running on a smooth road they may become serious or objectionable when the driving-motor is working on a heavy load or against a resistance which varies suddenly.

By the present invention subsidiary buffer-stops are provided on one or other of the wheel members, which are so arranged that while they allow a free relative circumferential movement equal to the maximum radial movement of the rim and felly they come into engagement with the driving-stops of the other member in advance of the engagement of the principal or positive driving-stops therewith and by the yielding resistance which they offer eliminate or reduce the shock of the impact of the main driving-stops. Such a device is particularly desirable and, in fact, is an absolute necessity in practice in the case of wheels in which, as in those constructed according to the present invention, the resilient cushions interposed between the rim and felly are so constructed or mounted as to minimize the frictional resistance to the relative circumferential movement of these two members and to reduce the shearing stresses to which these resilient cushions may be subjected.

Figure 2:
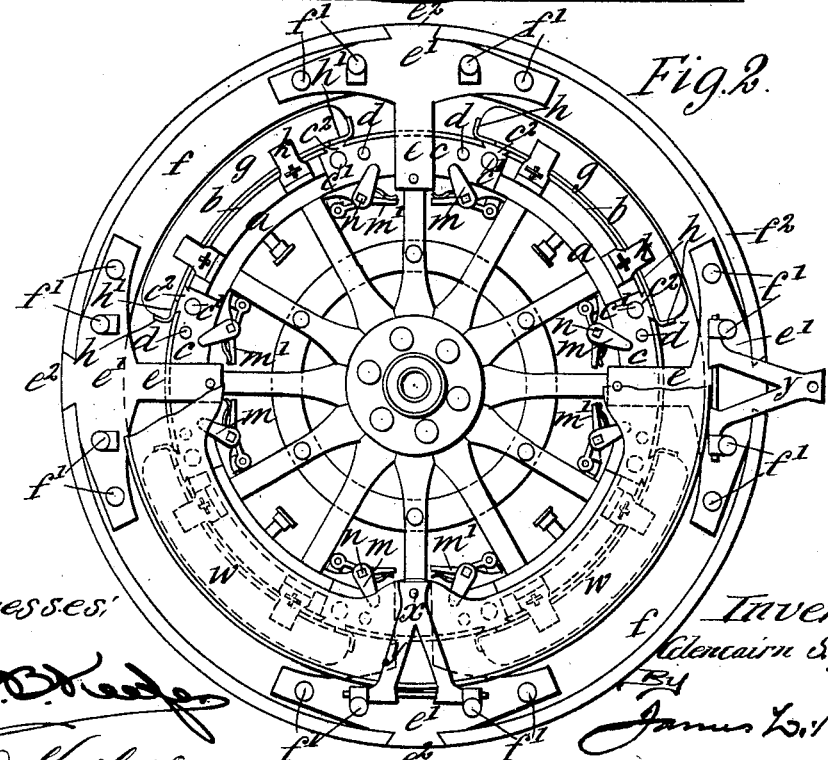

In the accompanying drawings, Figure 1 is a side elevation with the dust-covers removed of a driving-wheel constructed according to the present invention, showing the various parts in the relative positions which they would occupy when the resilient supporting-cushions are under maximum compression, as when the wheel is surmounting a considerable obstacle. Fig. 2 is a similar view, but with the two wheel members coaxial and showing the attachment of the dust-covers. Fig. 3 is a part-sectional side elevation, on an enlarged scale, showing the buffer-stops and the manner of mounting the resilient cushions. Figs. 4 and 5 are part transverse sections on lines 4 4 5 5, respectively, of Fig. 3. Fig. 6 is a plan view looking from the hub of the buffer-stops. Figs. 7 and 8 are transverse sections on lines 7 7 8 8, respectively, of Fig. 3. Figs. 9 and 10 are respectively a part side elevation and a part plan view looking from the hub of a modified buffer-stop construction, and Figs. 11 and 12 are corresponding views of another modified buffer-stop.

The felly $a$ is surmounted by a band of steel or other suitable wear-resisting material $b$ and has on each side driving-plates $c$, preferably four, which are secured by bolts or rivets $c'$ and preferably dovetailed into the edges of the band $b$, as shown at $c^2$. The felly driving-stops consist of pins $d$, passing through the felly and plates $c$ and extending outward beyond the latter to engage one on either side of the twin driving-horns $e$, which extend inwardly from rim driving-plates $e'$, suitably secured on the wooden rim $f$, as by means of bolts or rivets $f'$ and by dovetailing the plates $e'$, as at $e^2$, in the edges of the metal tread $f^2$, surmounting the rim.

The resilient cushions interposed between rim and felly consist of segmental blocks $g$ of solid or cored india-rubber or the like or pneumatic cushions or springs and are mounted on shoes $h$, which may be of metal or other suitable material and are mounted to slide within the range imposed by limiting-stops on the felly-band $b$, to which a suitable lubricant may be applied, so as to reduce the friction as much as possible. In the construction illustrated the shoes $h$ are turned up at the ends to retain the cushions $g$, preferably wired thereto, as shown, and have lateral projections $h'$, adapted to engage the adjacent driving-horns $e$, so as to limit the displacement of the cushions round the wheel when not under compression, it being essential, however, that such limitation should in no way interfere with the relative freedom of rim and felly, as herein set forth. Stop-plates $k$, suitably placed and secured on either side of the felly and preferably detachable therefrom at least on one side, serve as retaining-guides for the shoes $h$.

With wheels such as herein described having a certain free relative movement between the rim and felly it may frequently happen that a sudden change in the resistance to be overcome or other cause may result in a rapid relative circumferential movement of the rim and felly and a correspondingly violent encounter between one or more of the rim driving-horns and one or the other of the felly-stops with which they coöperate, and more particularly is this the case when by means of the antifrictional mounting of the resilient cushions described above the felly is enabled to rotate with freedom through a limited range within the cushion-shoes even when the cushions are in considerable compression between the rim and felly. Under such conditions, therefore, the wheel will be subject to shocks due to the impact of the driving-horns with their coöperating stops, and to obviate these there are mounted on the wheel subsidiary buffer-stops which offer yielding resistance to the engagement of the main or positive driving-stops, and thereby reduce the shock of impact between the latter. In the construction of Figs. 1 to 8 these subsidiary stops consist of buffer-arms $m$, secured at each end of transverse pins $n$, which are journaled in brackets $o$, fastened by screws or bolts $o'$ to the felly. The arms $m$ are mounted so as to come into engagement with the driving-horns $e$ before the latter encounter the main driving-stops $d$ of the felly. The pin $n$ is thereby turned in its bearings, and a spring $p$ is thereby compressed by engagement with another arm $m'$, secured to the pin $n$. When the buffer-arms are not in engagement with the driving-horns, they are maintained in a definite position by means of the spring $p$, which being slightly in compression against the arm $m'$ holds the rearwardly-projecting end of the latter in abutment against the sole of the bracket $o$.

The buffer-arms are mounted at such a distance apart when not in engagement that the total clearance between them and the coöperating driving-horns is at least equal to the total radial freedom under full compression of the resilient cushions between the rim and felly, the distance between the main felly-stops being greater than that between the buffer-stops by such an amount that engagement between the main felly-stops and their coöperating driving-horns will ensue before the springs $p$ are fully compressed. The springs $p$ would preferably be designed to transmit a considerable proportion, up to as much as one-third or even more, of the maximum driving effort; but lighter springs would be substituted therefor if it were desired to eliminate the small oscillatory impact-shocks between the stops which may occur under ordinary running conditions, or a combination of a light spring and a powerful spring may be employed, the light spring being arranged to come into action first. In any case, however, the buffer-arms should be spaced to fulfil the condition above set forth.

In the modified construction of Figs. 9 and 10 the rim driving-horns $e$ before engaging with the felly-stops $d$ encounter the outward-projecting ends of plates $r$, which are pivotally mounted on radial pins $r'$ within the felly and are closed inwardly against the action of transverse springs $s$, having follower-plates $s'$, mounted to slide in transverse guides $t$ within the felly.

In the modification shown in Figs. 11 and 12 the felly-stops $d$ are mounted in circumferential slots $d'$ in the felly, being normally held against the inner ends of these slots by tension-springs $u$. These slots are spaced, as in the other constructions, so that the total clearance between the driving-horns and their felly-stops in the normal position is equal to the total radial freedom between rim and felly. When the driving-horns encounter the felly-stops, the latter are displaced in their grooves against the increased tension of the springs $u$ and the compression of the springs $v$, connected to the operating felly-stops, until they are pressed against the farther end of the slot when the drive becomes a positive one between rigid stops.

Dust-covers $w$ are removably mounted on the wheel-rim, being secured in position thereon by means of the studs $x$ on the outer faces of the driving-horns and the spring-arms $y$, which engage over the studs $x$, as shown in Fig. 2 of the drawings.

It will be obvious that instead of spring-buffers, such as are herein described and illustrated, any usual equivalents may be substitued therefor—as, for example, india-rubber buffers or pneumatic buffers—without extending the scope of the present invention. Further, instead of facilitating the sliding of the resilient cushions on the felly of the wheel the antifriction-shoe might be dispensed on the outer face of the cushions, preferably in this case secured to the felly, so as to enable them to slide easily on the rim; but the other arrangement is usually preferable.

Having thus described the nature of my said invention and the best means I know of carrying the same into practical effect, I claim—

1. In wheels for road or other vehicles such as herein described, resilient cushions between the rim and felly mounted on sliding shoes, said cushions and shoes being free to move circumferentially with respect to said rim and felly, substantially as and for the purpose set forth.

2. In wheels for road or other vehicles having relatively movable rim and felly members, elastic cushions freely mounted between the said members and consisting of india-rubber blocks shod with metal on the surface which contacts with the wheel-rim, and stops engaging the said metal shoes to limit the free circumferential displacement of the elastic cushions, substantially as described.

3. In wheels for road or other vehicles having relatively movable rim and felly members, pairs of resilient buffer-stops mounted on one member and adapted to engage with driving-stops on the other member, said buffer-stops being spaced to give a total clearance between them and their coöperating driving-stops equal to the total radial freedom, between the two wheel members, substantially as described.

4. In wheels for road-vehicles having relatively movable rim and felly members, resilient cushions supporting one member upon the other and provided with sliding shoes, and driving-stops on one member coöperating with rigid driving-stops on the second member and with resilient buffer-stops also on the second member, said buffer-stops being spaced to come into operation before the said rigid stops and also to allow an absolutely free but limited circumferential movement of the driving-stops on the first member, substantially as described.

5. In wheels for road or other vehicles having relatively movable rim and felly members, a plurality of stops on one member, each coöperating with a pair of yielding buffer-stops on the second member spaced to give a total clearance at least equal to the total radial play between the two members, and with a pair of fixed stops also on the second member, said fixed stops being spaced to come into engagement with their coöperating driving-stops after the yielding buffer-stops aforesaid, substantially as described.

6. In wheels for road or other vehicles having relatively movable rim and felly members, india-rubber cushions for supporting one member upon the other and provided with metal soles and freely mounted between the said members, a plurality of stops on one member, each coöperating with a pair of yielding buffer-stops on the second member spaced to give a total clearance at least equal to the total radial play between the two members, and with a pair of fixed stops also on the second member, said fixed stops being spaced to come into engagement with their coöperating driving-stops after the yielding buffer-stops aforesaid, substantially as described.

In testimony whereof I have signed my name to this specification in the presence of two subscribing witnesses.

GLENCAIRN STUART OGILVIE.

Witnesses:
JOSEPH MILLARD,
GEORGE ISAAC BRIDGES.